United States Patent [19]

Kim et al.

[11] Patent Number: 4,859,524
[45] Date of Patent: Aug. 22, 1989

[54] REINFORCED COMPOSITE AND METHOD OF MANUFACTURE

[75] Inventors: Bang M. Kim, Schenectady, N.Y.; Harold F. Giles, Jr., Chesire, Mass.

[73] Assignee: General Electric Company, Schenectady, N.Y.

[21] Appl. No.: 135,762

[22] Filed: Dec. 21, 1987

[51] Int. Cl.$^4$ ............................................... B32B 3/26
[52] U.S. Cl. ................... 428/236; 156/272.2; 156/272.4; 428/251; 428/285; 428/286; 428/287; 428/409; 428/913
[58] Field of Search ............... 428/236, 251, 285, 286, 428/287, 409, 913; 156/272.2, 272.4

[56] References Cited

U.S. PATENT DOCUMENTS 4,716,072  12/1987  Kim ..................................... 428/212

OTHER PUBLICATIONS

"Composites" by T. Chou et al., Scientific American, vol. 255, No. 4, Oct. 1986, pp. 192-203.
"Processing Thermoplastic Advanced Composites" Plastic Technology, vol. 32, No. 11, Nov. 86, pp. 61-65.

*Primary Examiner*—Marion C. McCamish
*Attorney, Agent, or Firm*—William H. Steinberg; James C. Davis, Jr.; Paul R. Webb, II

[57] ABSTRACT

There is disclosed herein a reinforced multilayer thermoplastic resin composite blank having radio frequency sensitive material contained in at least one layer and a method of using radio frequency heating to manufacture a composite part with at least one surface having a smooth defect-free surface finish.

17 Claims, 2 Drawing Sheets

REINFORCED COMPOSITE AND METHOD OF MANUFACTURE

CROSS-REFERENCE OF RELATED APPLICATIONS

This application is related to copending application Ser. No. 947,152 now U.S. Pat. No. 4,716,072 filed Dec. 29, 1986 and assigned to the instant assignee.

BACKGROUND OF THE INVENTION

The present invention relates to a reinforced multilayer thermoplastic resin composite with at least one layer of radio frequency sensitive material and to a method of producing a composite by using radio frequency wherein said composite comprises at least one fiber-free surface.

A glass fiber reinforced composite product must demonstrate appropriate mechanical properties such as tensile, flexural and impact strength and possess a smooth, defect free surface on at least one side to replace parts formed from sheet metal panels. The suitability of using reinforced thermoplastic resin composites for vehicle body parts is currently being investigated. The sheet metal currently used for wide, thin body parts, such as the hood or trunk of an automobile, is a likely candidate for replacement by a glass fiber reinforced composite material.

Generally, such a glass fiber reinforced composite body part would be manufactured by providing layers of thermoplastic resin and fiber mat in the desired quantity and structural arrangement to form a laminated structure; by heating the laminate to a temperature in the range of about 200° C. to about 375° C. and by applying a pressure to the laminate in the range of about 5 lb/in$^2$ to about 50 lb/in$^2$, thereby forming a composite material blank and by shaping the composite blank by flow forming or compression molding processes to form the desired vehicle body part. While a composite material manufactured by such a process possesses the mechanical and flexural strength required of a vehicle body part, the high quality, smooth defect-free surface finish that is also required to meet automotive requirements for exterior body applications has been difficult to produce by the use of existing composite structures and processing techniques. A general discussion of existing processes for producing and for compression molding composites may be found in "Composites", Chou, T., et al., Scientific American, Vol. 255, No. 4, October 1986, pp. 192–203, and Krone, J. R., and Walker, J. H., "Processing Thermoplastic Advanced Composites", Plastics Technology, Vol. 32, No. 11, November 1986, pp. 61–5.

In a typical flow forming process the composite blank is heated in a conventional oven by convection or infrared radiation to a temperature in the range of about 200° C. to about 375° C. During the initial heating in the oven the fibers expand, resulting in a resin poor coating of their surface. In addition, this expansion of the fibers results in a lofting, or movement, of the fibers into the resin surface layers.

Following the oven heating, the composite is transferred to the mold where it is shaped by applying pressure in the range of about 1000 lb/in$^2$ to about 4000 lb/in$^2$ with mold surfaces whose temperatures range from about 65° C. to 150° C. During the transfer of the composite from the oven to the mold the composite surface cools and the surface resins "freeze" into position. This "freezing" of the resin at the surface prevents the resin from flowing readily during the molding process and, consequently, rough boundaries are produced between the newly formed surface areas and the original surface areas. In addition, the resulting composite surface is only partially filled with resins, even though some hot resin will move from the composite core to the surface during the molding process. This partially filled resin surface, particularly around and near the lofted fibers, is a major cause of surface roughness.

An additional problem inherent in existing molding processes arises from conventional methods of heating the composite. Conventional heating during the compression molding operation relies upon heat conduction from the outer surface layers to melt the inner bulk layer. Thus, a temperature gradient is established across the composite from the surface layer to the interior. Prolonged heating to ensure that the inner bulk layer has melted can result in an oversoftening of the surface layer resin, which in turn facilitates the lofting of fibers into the surface layer, which, as already noted, can be a cause of surface roughness. This prolonged heating can also cause thermal decomposition of the resin. A final disadvantage of current production techniques, is the length of time required to heat the composite. Conventional heating by convection or infrared radiation, sufficient to melt the composite so that it can be molded, may take from eight to ten minutes due to the relatively poor thermal conductivity of thermoplastic resins. Valuable production time is thereby lost by use of a production method which, moreover, results in a product with a rough surface.

Certain processes for manufacturing thermoplastic resin products—as opposed to reinforced thermoplastic resin composites—utilize a heating technique known as radio frequency (RF) heating. RF heating utilizes the dielectric properties of a material to generate heat therein. When electromagnetic radiation at a selected radio frequency is applied to the material, the alternating electric field of the RF electromagnetic radiation causes an oscillatory displacement of the charged components of the material, thereby resulting in a rise in the temperature of the material. The amount of heat generated therein is given by the formula:

$$P = K\epsilon \tan\delta$$

where
P = heat generated;
K = constant dependent upon the frequency of the applied radiation, the electric field strength, the material dimensions, and the units used;
$\epsilon$ = dielectric constant of the material; and
$\tan\delta$ = loss tangent or dissipation factor of the material.

The ability of a material to generate heat when exposed to RF radiation is referred to as its RF sensitivity.

RF heating has been used on thermoplastic resins that have traditionally been difficult to process, such as ultrahigh molecular weight polyethylene. It has been possible to mold and extrude such a thermoplastic resin with conventional equipment by the addition to it of RF sensitive material, i.e., material having a sensitivity greater than the material to which it is added.

It is an object of the present invention to provide a method of making fiber reinforced composite parts with smooth surfaces by flow forming processes.

It is a further object of the present invention to provide a composite blank suitable for making fiber reinforced composite parts by flow forming processes.

It is yet a further object of the present invention to provide a method of making fiber reinforced composite parts with smooth surfaces by flow forming processes that has fast melting of the resin in the composite and minimized decomposition of the resin at the surface.

It is another object of the present invention to provide a composite blank suitable for making fiber reinforced composite parts by flow forming processes that has fast melting of the resin in the composite and minimized decomposition of the resin at the surface.

SUMMARY OF THE INVENTION

In one aspect of the present invention a composite blank is provided comprising a fiber fill layer of thermoplastic resin and a bulk layer comprising fiber mat compounded with thermoplastic resin and radio frequency sensitive material. The fiber-free layer is adhered to the bulk layer.

BRIEF DESCRIPTION OF THE DRAWING

The subject matter which is regarded as the invention is particularly pointed out and distinctly claimed in the concluding portion of the specification. The invention however, both as to organization and method of practice, together with further objects and advantages thereof, may best be understood by reference to the following description taken in conjunction with the accompanying drawing figures in which:

DETAILED DESCRIPTION OF THE INVENTION

Figure 1:
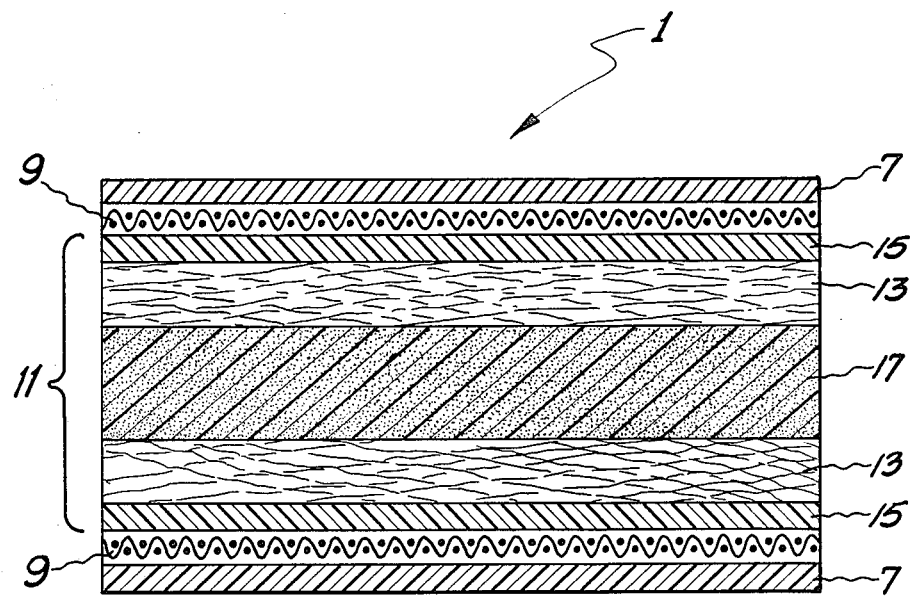
FIG. 1 depicts in cross-section, a laminate comprising a set of layers of materials in accordance with a preferred embodiment of the present invention.

Referring now to the drawing wherein like numerals indicate like elements throughout and particularly FIG. 1 thereof, a laminate 1 in accordance with the present invention is shown. The laminate comprises a pair of surface layers 7, comprising fiber-free thermoplastic resin, positioned on top and bottom of laminate 1. A barrier layer 9 underlies each surface layer 7 and comprises a woven screen or porous sheet of glass, a polymer, or a thermoplastic resin having a higher viscosity than the thermoplastic resin of inner bulk layer 11. Barrier layers 9 act to limit fiber lofting when heat and pressure are applied to the laminate. While the presence of the barrier layers is preferred, these layers may be omitted, or they may be limited to that half of the laminate where a smooth surface is required, as will be further discussed in connection with FIG. 2. Inner bulk layer 11 is positioned between the two barrier layers 9 and comprises at least one layer of fiber mat and at least one layer of thermoplastic resin and RF sensitive material. As shown in FIG. 1, inner bulk layer 11 includes, in sequential order, a layer of thermoplastic resin 15, a layer of fiber mat 13, a layer of thermoplastic resin and RF sensitive material 17, a layer of fiber mat 13, and a layer of thermoplastic resin 15.

All known thermoplastic resins are suitable for use in the surface layer of the present invention. Typical thermoplastic resins include polycarbonate, polyamide, polyimide, polybutylene-terephthalate, polyethylene-terephthalate, polyethylene, polypropylene, polyethylene oxide, and acrylonitrile-butadiene-styrene, etc. Various blends of these resins may also be used in accordance with the present invention. Specifically, for motor vehicle applications good oil resistance is desirable. Some resins possessing this particular characteristic include polybutylene-terephthalate, polypropylene, and a polybutylene terephthalatepolycarbonate blend. If desired or deemed necessary, suitable bonding agents well known to those skilled in the art may be applied between adjacent layers.

Inner bulk layer 11 comprises fiber material, thermoplastic resin, and radio sensitive material. Glass, carbon, or ceramic fibers, or mixtures thereof, may be used with equal facility in the present invention, but glass fibers are preferred for motor vehicle applications due to their comparatively low cost. Any thermoplastic resin, such as those previously listed, or blends thereof, may be used in the inner bulk layer.

Thermoplastic resins inherently possess some degree of sensitivity to RF radiation, though the degree of such sensitivity varies between the many species of resin. Thus, the sensitivity of a composite to RF radiation can be enhanced by the addition of RF material having a greater RF sensitivity to the composite. By selectively placing RF sensitive material in a thermoplastic resin composite, a selective or preferential heating of the chosen location may be accomplished. For example, by placing RF sensitive material in the inner bulk layer, as shown in FIG. 1, and by applying RF radiation, the inner bulk may be heated preferentially.

The precise amount of RF sensitive material used in accordance with the present invention will depend upon several factors, including the desired heating time, the particular RF sensitive material used and the available RF equipment. Generally a sufficient amount of RF sensitive material should be added to a particular layer, e.g., the inner bulk layer, to promote a heating of that layer above the temperature at which the resin melts. Non-thermoplastic resin and thermoplastic resin RF sensitive materials may be used jointly to achieve desired heating characteristics.

As noted earlier, all thermoplastic resins possess some degree of RF sensitivity. Certain thermoplastic resins, however, exhibit a high degree of sensitivity to RF radiation, thereby making them particularly suitable for use as an RF sensitive material. Examples of such RF sensitive thermoplastic resins are polyvinyl chloride, polyamide, acrylic resins, amino resins, and combinations thereof. Any thermoplastic resin that generates heat at about a ten percent or greater rate than any other thermoplastic resin component of the composite may be used, also. Thus, a thermoplastic resin selected such that the product of its dielectric constant and its dissipation factor is at least about ten percent greater than the largest obtainable product of the corresponding characteristics of any other thermoplastic resin component of the composite may be used as an RF sensitive material. When RF sensitive thermoplastic resins are used, the amount is generally at least about 10% to 100% of the resin content of the particular layer in which the resin is incorporated.

Non-thermoplastic resin RF sensitive materials that may be used include carbon powders; metal powders such as aluminum and iron; metal oxides such as zinc oxide and iron oxide; mixed metal oxides such as bentonite and clay; aluminosilicates; and combinations thereof. Where nonthermoplastic RF sensitive material is used, the maximum amount of such material should be that amount which preserves the mechanical properties, such as tensile, flexural and impact strength the composite, which is generally up to about thirty percent by weight of the laye in which it is incorporated.

By applying RF radiation in the range of about 1 MHz to about 200 MHz in accordance with the present invention to the embodiment shown in FIG. 1, inner bulk layer 11 is preferentially heated and a temperature gradient reverse of that established by conventional heating results. Thus, the composite is uniformly heated from the center of the composite outwardly to the surface layers, i.e., heat is conducted to the surface layers from those portions of the composite that contain RF sensitive materials. Overheating of the surface layers, which leads to the problems of surface layer oversoftening and surface resin decomposition, is avoided with the present invention. By controlling the amount of softening of the surface layer, the lofting of fiber into that layer is controlled. When molded, the final product will have a resin-rich, very smooth or defect-free finish.

In a representative sample prepared in accordance with the present invention a compression molded composite possessing a laminate structure similar to the structure shown in FIG. 1 displayed a resin rich surface with a very smooth finish. As originally prepared, barrier layer 9 was omitted and layer 17 actually comprised two separate sheets of thermoplastic resin and RF sensitive material. The use of two layers (not shown), as opposed to one layer as shown in FIG. 1, was a matter of convenience as will be obvious to those skilled in the art. Glass fiber mats were used as reinforcement and the thermoplastic resins consisted of Valox®-Lexan® resin blend, i.e., a polycarbonate-poly-butylene terephthalate blend. The RF sensitive material consisted of 1.0 parts of Struktol Frequon® B-20, a commercially available, proprietary, RF sensitive material, per one hundred parts of resin (1.0 phr or 1%). Heating of the composite was accomplished by application of radio frequency radiation of about 80 MHz in approximately three minutes, in contrast with the eight to ten minutes required with a conventional oven, thereby clearly indicating a potential saving of valuable production time.

Figure 2:
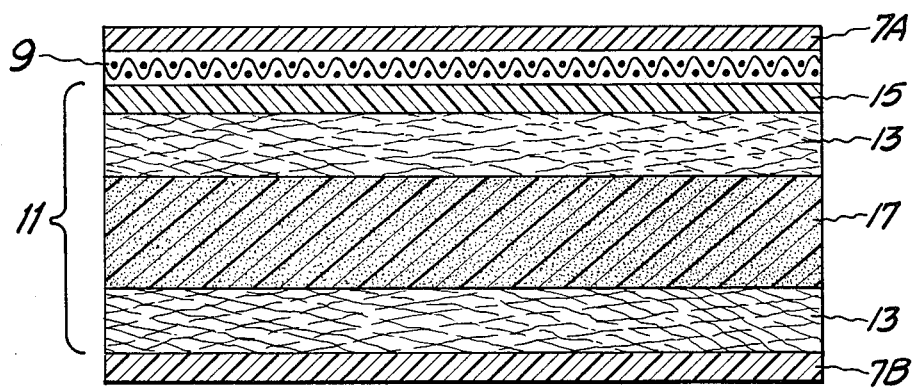
FIGS. 2 and 3 each illustrate alternative laminates in cross-section.

FIG. 2 illustrates another laminate 3 in accordance with the present invention where only a single smooth surface is desired. Surface layers 7A, and 7B comprise thermoplastic resins. Barrier layer 9 is placed adjacent the desired smooth surface layer 7A. As with the embodiment shown in FIG. 1, barrier layer 9 may be omitted if desired. As shown in FIG. 2, inner bulk layer 11 is placed between barrier layer 9 and surface layer 7B. Inner bulk layer 11 includes an asymmetric structure of fiber material and thermoplastic resin. Thus, inner bulk layer 11 includes a layer of thermoplastic resin 15, a layer of fiber mat 13, a layer of thermoplastic resin and RF sensitive material 17 and a layer of fiber mat 13. Provision of a distinct layer of resin 15 and optional barrier layer 9 between surface layer 7A and fiber mat 13 makes lofting of fiber into the surface layer less likely.

Figure 3:
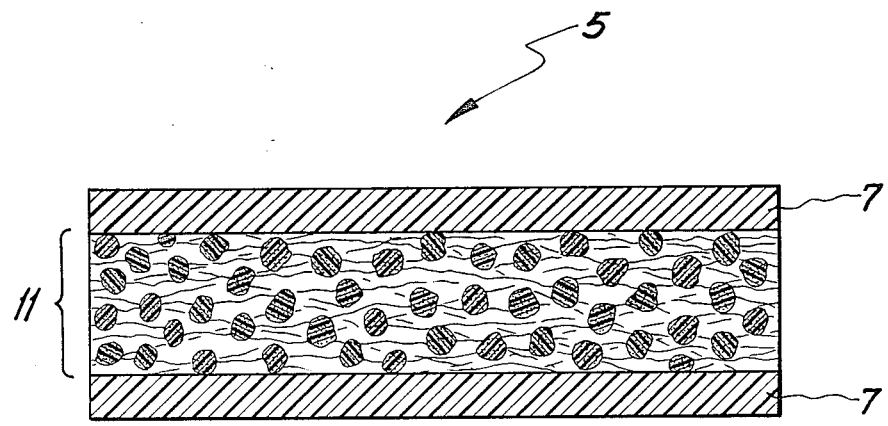

FIG. 3 illustrates yet another cross-section of a laminate 5 in accordance with the present invention. Surface layer 7 comprise fiber-free thermoplastic resin placed adjacent inner bulk layer 11. Inner bulk layer 11 comprises fiber mat, thermoplastic resin, and radio frequency sensitive material. Inner bulk layer 11 may be constructed, for example, by permeating a fiber mat with RF sensitive thermoplastic resin powders or pellets or with thermoplastic resin powders or pellets that include RF sensitive material.

Alternatively, RF sensitive material may be included in the fiber-free thermoplastic resin surface layers, or in the resin surface layers as well as in the inner bulk layer in accordance with the present invention. Thus, RF sensitive material may be placed in the surface layers of FIGS. 1, 2 and 3. Depending on which layer is to be preferential heated, the total sensitivity of that layer is chosen to be greater than the sensitivity of the remaining layers. The total sensitivity of each layer may be controlled by the careful selection of the particular RF sensitive material and the concentration of the RF sensitive material in the respective layers. When thermoplastic resins are selected as the RF sensitive material, the criteria discussed in connection with FIG. 1 should be used; that is, the sensitivity of the RF sensitive thermoplastic resin is compared to the sensitivity of any other resin component in the layer in which the RF sensitive thermoplastic resin is incorporated.

Figure 4:
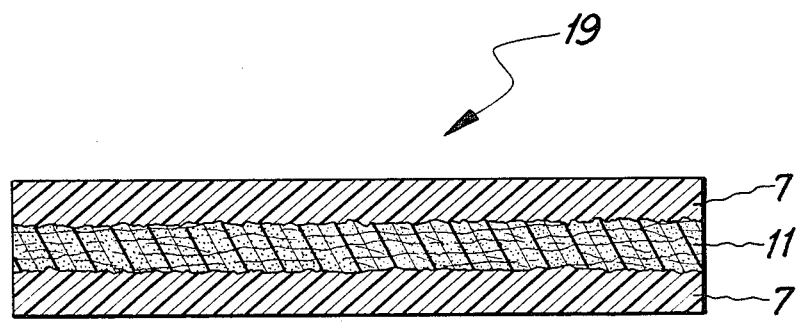
FIG. 4 illustrates a cross-sectional view of a composite blank formed from a laminate in accordance with the present invention upon heating the laminate and subjecting it to pressure.

FIG. 4 illustrates a composite blank 19 formed after a laminate comprising a set of layers of material in accordance with the present invention has been heated and subjected to pressure. The use of RF energy in forming the composite blank is not necessary. RF heating will be used when the composite blank is formed by a flow forming process into a part. Thermoplastic resin surface layers 7 lie on opposite sides inner bulk layer 11, which comprises fiber material, thermoplastic resin and RF sensitive material. Barrier layers 9 have been omitted in this example.

Composite blanks having selective layers with greater RF sensitivity can be formed into parts by a variety of flow forming processes. Composite blanks with interior layers having greater RF sensitivity than the outer layers can be roller formed after the composite blank has been subjected to RF heating to preferentially heat the interior of the blank. Roller forming is described in copending application Ser. No. 087,053 entitled "Roller Forming of thermoplatic sheet material" and assigned to the instant assignee. The application is hereby incorporated by reference.

Expanded composite sheet structures suitable for use in partitions, panels and doors, for example, can be fabricated from composite blanks having bulk layers with greater RF sensitivity than the outer layers. The composite blank is heated using RF energy allowing the recoil force of the compressed fibers to expand the composite blank within imposed boundaries. The composite blank cools providing a low density composite product.

Composite blanks with interior layers having greater RF sensitivity than the outer layers can be compression molded by heating the composite blank using RF heating to quickly and more uniformly heat the composite than by convection or infrared heating alone which can cause the resin at the surface to melt first and result in projection of fibers through the surface. If desired a combination of infrared or convection with RF heating can be used to heat the composite blank prior to compression molding.

In other applications, it is desirable to have a composite blank with a thick outer fiber-free layer having greater RF sensitivity than the interior layer. A mold with a hot surface above the melting point of the resin is used and the blank formed under pressure. The melted outer resin layer quickly fills the voids in the mold.

Composite blanks having selected layers with increased susceptability to RF heating due to the addition of RF sensitizers results in quicker heating of the composite with less structural decomposition of the resin.

While the invention has been particularly shown and described with reference to preferred embodiments thereof, it will be understood by those skilled in the art that various changes in form and detail may be made without departing from the spirit and scope of this invention.

What is claimed is:

1. A composite blank comprising:
    a fiber-free layer of thermoplastic resin; and
    a bulk layer comprising fiber mat compounded with thermoplastic resin and radio frequency sensitive material, said radio frequency sensitive material being a member selected from the consisting of carbon powders, metal powders, metal oxides, mixed metal oxides, aluminosilicates, and combinations thereof; said radio frequency sensitive material comprising between 0.5% to about 30% by weight of said composites said fiber-free layer adhered to said bulk layer.

2. The composite of claim 1, further comprising a barrier layer adhered between said bulk layer and said fiber-free layer to inhibit movement of fibre from the bulk layer into said fiber-free layer.

3. The composite of claim 2 wherein said barrier layer is a woven screen of glass, polymer, or a porous sheet of any of said last recited materials, or a layer of a thermoplastic resin material having a higher viscosity than said bulk layer.

4. A composite blank comprising:
    a fiber-free layer of thermoplastic resin; and
    a bulk layer comprising fiber mat compounded with thermoplastic resin and radio frequency sensitive material, said radio frequency sensitive material comprising a thermoplastic resin selected such that the product of its dielectric constant and its dissipation factor is at least about 10 percent greater than the largest obtainable product of corresponding characteristics of any other thermoplastic resin component of said composite said fiber-free layer adhered to said bulk layer.

5. The composite of claim 4 further comprising a barrier layer adhered between said bulk layer and said fiber-free layer to inhibit movement of fiber from the bulk layer into said fiber-free layer.

6. The composite of claim 5 wherein said barrier layer is a woven screen of glass, polymer, or a porous sheet of any of said last recited materials, or a layer of a thermoplastic resin material having a higher viscosity than said bulk layer.

7. The composite of claim 4 wherein said radio frequency sensitive thermoplastic resin comprises a minimum of about 10% by weight of said bulk layer.

8. A composite blank comprising:
    a fiber-free layer of thermoplastic resin; and
    a bulk layer comprising fiber mat compounded with thermoplastic resin and radio frequency sensitive material, said radio frequency sensitive material being a thermoplastic resin selected from the group consisting a polyvinyl chloride, polyamide, acrylic resin, amino resin, and combinations thereof, said fiber-free layer adhered to said bulk layer.

9. The composite of claim 8 further comprising a barrier layer adhered between said bulk layer and said fiber-free layer to inhibit movement of fiber from the bulk layer into said fiber-free layer.

10. The composite of claim 9 wherein said barrier layer is a woven screen of glass, polymer, or a porous sheet of any of said last recited materials, or a layer of a thermoplastic resin material having a higher viscosity than said bulk layer.

11. A composite blank comprising:
    a surface layer comprising a fiber-free thermoplastic resin compounded with a radio frequency sensitive material; and
    a bulk layer fiber mat compounded with thermoplastic resin, said surface layer adhered to said bulk layer.

12. The composite of claim 11 further comprising a barrier layer adhered between said bulk layer and said surface layer to inhibit movement of fiber from the bulk layer into said fiber-free layer.

13. A composite blank comprising:
    a surface layer comprising a fiber-free thermoplastic resin compounded with a radio frequency sensitive material; and
    a bulk layer comprising fiber mat compounded with thermoplastic resin and a second radio frequency sensitive material, said surface layer adhered to said bulk layer.

14. The composite of claim 13 wherein said surface layer is more sensitive to radio frequency radiation than the bulk layer.

15. The composite of claim 13 wherein said bulk layer is more sensitive to radio frequency radiation than the surface layer.

16. A method of making a fiber reinforced composite part having at least one smooth defect-free surface comprising the steps of;
    providing a composite blank having a fiber-free thermoplastic surface layer and a fiber reinforced thermoplastic resin bulk layer having radio frequency sensitive material;
    heating said composite blank by electromagnetic radiation at a predetermined radio frequency thereby preferentially heating the bulk layer; and
    applying pressure to the composite blank to form a fiber reinforced composite part.

17. A method of making a fiber reinforced composite part having at least one smooth defect-free surface comprising the steps of;
    providing a composite blank having a surface layer comprising a fiber-free thermoplastic resin compounded with a radio frequency sensitive material and a fiber reinforced thermoplastic resin bulk layer;
    heating said composite blank by electromagnetic radiation at a predetermined radio frequency thereby preferentially heating the bulk layer; and
    applying pressure to the composite blank using a mold heated above the melting of the thermoplastic resin the surface layer to form a fiber reinforced composite part.

* * * * *